US011464200B2

(12) United States Patent
Tobergte et al.

(10) Patent No.: US 11,464,200 B2
(45) Date of Patent: Oct. 11, 2022

(54) PROCESS FOR MAKING A STRAW MAT, STRAW MAT AND STRAW BARN

(71) Applicant: BIG DUTCHMAN INTERNATIONAL GMBH, Vechta (DE)

(72) Inventors: Christian Tobergte, Vechta (DE); Heinz Olliges, Friesoythe (DE)

(73) Assignee: BIG DUTCHMAN INTERNATIONAL GMBH, Vechta (DE)

( * ) Notice: Subject to any disclaimer, the term of this patent is extended or adjusted under 35 U.S.C. 154(b) by 329 days.

(21) Appl. No.: 16/513,829

(22) Filed: Jul. 17, 2019

(65) Prior Publication Data
US 2020/0029527 A1    Jan. 30, 2020

(30) Foreign Application Priority Data
Jul. 25, 2018 (EP) ...................................... 18185476

(51) Int. Cl.
| *A01K 1/01*  | (2006.01) |
| *A01K 1/015* | (2006.01) |
| *A01K 1/00*  | (2006.01) |
| *A01K 1/10*  | (2006.01) |
| *A01K 7/00*  | (2006.01) |
| *A01K 29/00* | (2006.01) |

(52) U.S. Cl.
CPC ............ *A01K 1/015* (2013.01); *A01K 1/0047* (2013.01); *A01K 1/10* (2013.01); *A01K 7/00* (2013.01); *A01K 29/00* (2013.01)

(58) Field of Classification Search
CPC ......... A01K 1/015; A01K 1/02; A01K 1/0047
See application file for complete search history.

(56) References Cited

U.S. PATENT DOCUMENTS

| 6,857,390 B1* | 2/2005 | Maendal ................. A01K 1/10 |
| | | 119/51.01 |
| 8,065,976 B1* | 11/2011 | Bryant .................... A01K 1/00 |
| | | 119/449 |
| 9,402,372 B2 | 8/2016 | Fuchs et al. |
| 2003/0192485 A1* | 10/2003 | Opfel .................... A01K 1/015 |
| | | 119/526 |
| 2004/0050338 A1* | 3/2004 | Ford ...................... A01K 31/18 |
| | | 119/437 |
| 2013/0233036 A1* | 9/2013 | Hoxsey ................... B09C 1/08 |
| 2016/0183493 A1 | 6/2016 | Waybright |
| 2017/0105383 A1* | 4/2017 | Chang .................... A01K 1/00 |

(Continued)

FOREIGN PATENT DOCUMENTS

| EP | 1099370 | 5/2001 |
| EP | 1564664 | 8/2005 |

(Continued)

*Primary Examiner* — Joshua J Michener
*Assistant Examiner* — Henry Hooper Mudd
(74) *Attorney, Agent, or Firm* — Price Heneveld LLP

(57) ABSTRACT

A method for producing a straw mat in a living space for livestock, in particular for sows and/or fattening pigs and/or piglets, confined in a straw pen, is disclosed. The method comprises the step of automatically and initially spreading straw, such as defibrated straw, into the living space up to a substantially uniform thickness (d) of the straw mat. Also disclosed is a straw pen and pen building in accordance with the disclosed method.

17 Claims, 7 Drawing Sheets

(56) References Cited

U.S. PATENT DOCUMENTS

2017/0293305 A1* 10/2017 Altomare ................ G05D 1/02
2019/0021274 A1     1/2019 Remmert

FOREIGN PATENT DOCUMENTS

| EP | 3066916 | 9/2016 |
| EP | 3402322 | 11/2018 |
| WO | 2018234374 | 12/2018 |
| WO | 2018234379 | 12/2018 |
| WO | 2019120787 | 6/2019 |

* cited by examiner

PROCESS FOR MAKING A STRAW MAT, STRAW MAT AND STRAW BARN

CROSS-REFERENCE TO FOREIGN PRIORITY APPLICATION

The present application claims the benefit under 35 U.S.C. §§ 119(b), 119(e), 120, and/or 365(c) of European Application No. EP 18185476.1 filed Jul. 25, 2018.

FIELD OF THE INVENTION

The present invention relates to a method for producing a straw mat for livestock, in particular, for sows and/or fattening pigs and/or piglets, and to a straw pen having such a straw mat.

BACKGROUND OF THE INVENTION

Methods and devices of the type mentioned at the outset, are known in principle from the prior art, for example, from recommendations by the Kuratorium fur Technik and Bauwesen in der Landwirtschaft e.V. (Board of Curators for Technology and Construction in Agriculture e.V.). Straw pens for sows, that is to say, pens having a straw mat in a living space for the sows, are in particular known from the prior art.

The present invention has now recognized that straw pens of this type, or corresponding straw mats, respectively, in the living area of such straw pens for avoiding liquid manure-infested pens have in principle become known in order for the odor pollution by manure associated with liquid manure-infested pens be avoided, but that this fundamental advantage comes at the cost of quite a number of disadvantages. This is because the invention has inter alia recognized that these types of pens according to the recommendations of the Board of Curators for Technology and Construction in Agriculture e.V. require a relatively intense use of straw, which leads to a significant growth in the liquid manure mat in the living space of the livestock. In this context, manure mat thicknesses of approximately 80 cm are conventionally generated in straw pens in the prior art. Consequently, these large quantities of manure, in turn, disadvantageously also require significant storage capacities and, besides the cost for the significant quantities of straw, thus also cause costs for storing the manure.

Moreover, the manure from this type of straw pen disadvantageously typically has a moist-sticky consistency below the top layer and, associated therewith, not insignificant emissions of ammonia by virtue of putrefaction processes. While it has alternatively become known in the prior art for the living space to be mucked out of the afore-mentioned manure mat also within a fattening run, this however directly leads to the disadvantage of associated unrest in the animal population and is moreover also a problem in terms of logistics, since the animals when mucking out within a fattening run have to be guided away from their holding areas in order for space to be made for the machines required for the mucking out of manure mats of this type.

SUMMARY OF THE INVENTION

It is an object of the present invention to provide methods and devices of the type mentioned at the outset which enable a more economical and at the same time species-appropriate farming of livestock in straw pens in a better manner than is presently known.

This object is achieved by the subject matter of the independent claims.

The aforementioned object is in particular achieved by a method for producing a straw mat in a living space for livestock, in particular for sows and/or fattening pigs and/or piglets, provided in a straw pen, according to the subject matter of independent claim 1.

One advantage of the present invention, in particular, lies in that the straw requirement for producing a straw pen is significantly reduced on account of the automatic initial spreading of preferably defibrated straw into the living space up to a substantially uniform thickness of the straw mat. This is because, on the one hand, complex manual spreading is avoided on account of the automatic initial spreading of straw, wherein the straw quantity required for a specific living space can at the same time be precisely determined and also adhered to on account of the automation. Moreover, it is achieved on account of the automatic initial spreading only up to a substantially uniform thickness of the straw mat in the living space that only the absolutely required minimum quantity of straw is required for the straw mat.

The farming of livestock on straw is thus significantly simplified thanks to the invention, since, in particular, the input in terms of straw and personnel in the farming on straw according to the invention is significantly reduced.

Moreover, a non-uniform thickness of the straw mat, which is almost always present in the case of manual spreading, is avoided on account of the present invention.

Overall, the present invention thus offers the advantage that the overall straw consumption in relation to known straw pens is reduced by at least approximately 50%, while the workload for the livestock owner in the case of a straw mat, produced according to the invention is at the same time likewise, very significantly reduced on account of the automatic generation of a uniform thickness. It has been demonstrated, in particular, in the case of breeding piglets that the straw requirement in kilograms per animal space and day is able to be reduced from the value of 0.5 kilograms per animal space and day known from the prior art to below 0.2 kilograms per animal space and day on account of the present invention.

The present invention is, in particular, distinguished by the advantage that said invention on account of the straw mat generated addresses a natural animal behavior and at the same time avoids liquid manure, while said invention, in particular, in comparison to the straw pens of the type mentioned at the outset known from the prior art produces very significantly less manure, specifically up to 50% less manure.

The present invention offers the further advantage that despite the reduction of the straw quantity required for producing the straw mat, described multiple times above, joint and bone problems in the animals can furthermore be almost excluded by virtue of the uniformity of the straw mat generated in an automated manner according to the invention. In particular, abscesses in the livestock no longer arise by virtue of the resilience of the straw mats in the case of farming of livestock in a living space on a straw mat produced according to the invention. Decubitus is also prevented on account of the straw mat produced according to the invention.

As a surprising advantage of the present invention it has been demonstrated that ring-tailed pigs as livestock can also be kept very well on straw since a cannibalistic behavior of the ring-tailed pigs known from the prior art can be almost completely prevented on account of the subject matter of the present invention.

Moreover, the present invention also avoids problems that have become known in the farming of livestock on slatted floors; in particular, pigs can exercise their natural rummaging behavior in a significantly better manner on a straw mat according to the invention which is preferably permanently kept free of holes, moist areas, and/or putrefaction. As a further surprising advantage of the present invention it has been demonstrated that the straw mat produced or obtained, respectively, according to the invention can preferably also generate heat and thus can preferably contribute toward heating a corresponding pen building and thus toward significant savings in energy costs.

Further preferred embodiments of the invention are stated in the dependent claims.

One preferred embodiment of the invention is distinguished in that the initial spreading is performed up to a substantially uniform thickness of the straw mat of at most approximately 0.2 m, preferably at most approximately 0.1 m, furthermore preferably at most approximately 0.05 m. The advantages of the invention described above are further improved on account of the aforementioned thicknesses, furthermore preferably of thicknesses of approximately 0.2 m, approximately 0.1 m, and approximately 0.05 m, respectively. The straw consumption is, in particular, even further reduced on account of these preferred thicknesses. The present invention, has at the same time established that these preferred thicknesses maintain the resilience or elasticity, respectively, of the base formed by the straw mat for the livestock, since the uniformity of the thickness of the straw mat can be ensured also in the case of these preferred, particularly minor, thicknesses on account of the automated spreading of the straw. The invention has also recognized that, after the initial spreading and prior to being occupied with livestock, a thickness is also readily adjustable so as to be adapted to the respective type of livestock, in as far as is desired and/or required, on account of the automated initial spreading.

One preferred embodiment of the invention is distinguished in that a separating element which separates a moving and resting space for the livestock from a drinking and feeding region for the livestock is provided in the living space, wherein the initial spreading in the moving space is performed up to a substantially uniform thickness of the straw mat of at most 100%, preferably at most 50%, furthermore preferably at most 20%, of a height of the separating element that is directly adjacent to the straw mat. This embodiment offers the advantage it is ensured on account of limiting the maximum thickness of the initially spread straw mat relative to the separating element that ideally, no straw makes its way into the drinking and feeding region of the livestock, on account of which it is, in turn, advantageously prevented that water optionally present in the drinking and feeding region, or moisture present therein, is introduced into the straw mat lying in the moving space. It is advantageously achieved in this way that the straw mat in the moving space stays sufficiently dry so as to maintain the desired elasticity of the straw mat in order to permanently prevent decubitus, joint and bone problems, or abscesses in the livestock.

One preferred embodiment of the invention is distinguished by the step: delivering a composting agent, preferably including a mineral soil additive, which promotes the rotting process and substantially prevents putrefaction into the living space. This embodiment offers the further advantage, in particular, when using a mineral soil additive in the composting agent, that the reduction in putrefaction arising in the straw mat, present anyway on account of the thin straw mat according to the invention, is further improved and harmful germs in the straw mat are prevented. Instead, a rotting process-promoting bacteria flora and active substances which prevent the development of illnesses are advantageously formed in the straw mat in the case of this embodiment. A chemical disinfection of the straw mat is advantageously not required. The risk of hospitalitis in the livestock is even further reduced in the case of this embodiment in a furthermore advantageous manner.

One preferred embodiment of the invention is distinguished in that the initial spreading is performed using straw which includes a composting agent, preferably including a mineral soil additive, which promotes a rotting process and substantially prevents putrefaction. In the case of this embodiment, the composting agent, preferably including a mineral soil additive, is not introduced separately but conjointly with the straw of the initial spreading. In this way, an additional operative step for introducing the composting agent is saved.

One preferred embodiment of the invention is distinguished in that stone meals obtained by a grinding process from natural rocks are used as the soil additive. The rock types quartzite, granite, slate, diabas, and/or basalt are particularly preferably used to this end.

One preferred embodiment of the invention is distinguished by the step: the thickness of the straw mat after the initial spreading is increased by automatic demand-based post-spreading by at most 20%, preferably at most 10%, furthermore preferably at most 5%, of the thickness of the straw mat present after the initial spreading. The advantages of this embodiment lie particular in ensuring a minor and controlled growth of the straw mat by automatic demand-based post-spreading of a predetermined percentage of the thickness already present. The advantages according to the invention mentioned at the outset herein are implemented in a particularly effective manner, since an uncontrolled growth of the manure mat, as is known in the prior art, is prevented on account the demand-based post-spreading. Rather, an absolute minimization of the straw consumption for obtaining the elasticity of the straw mat required for implementing the advantages mentioned at the outset is advantageously achieved in the case of this embodiment. A further advantage of this embodiment lies in that the overall creation of manure is further reduced on account of the further reduced overall consumption of straw. A further particular advantage of this embodiment lies in that the climate in a straw pen having a straw mat of this embodiment, produced according to the invention, is further improved since the ammonia pollution in the pen air is further reduced. At the same time, the infestation of livestock by flies on a straw mat produced in such a manner is also further reduced on account of the demand-based post-spreading.

One preferred embodiment of the invention is distinguished by the step: the thickness of the straw mat after the initial spreading is set by automatic demand-based post-spreading in a range of at most approximately 0.5 m, preferably at most approximately 0.3 m, furthermore preferably at most approximately 0.2 m, even furthermore preferably at most 0.1 m. The invention has recognized that the advantages of the present invention can be implemented in particular by way of the aforementioned dimensions of the maximum thickness of the straw mat after the automatic demand-based post-spreading. The invention herein has also recognized that after the post-spreading thicknesses in the range from approximately 0.3 m to 0.5 m are particularly suitable for fattening pigs, while thicknesses after the post-spreading in a range from approximately 0.2 m to approximately 0.3 m are particularly suitable for sows, while thicknesses after the post-spreading in the range from approximately 0.1 m to approximately 0.2 m are particularly suitable for piglets. The invention has recognized that the thicknesses of the straw mat after the initial spreading by automated demand-based post-spreading can be adapted to the weight of the livestock in order for the straw consumption, or the manure generated, respectively, be further reduced in a manner adapted to the weight of the animals, while the advantages of the invention described at the outset are further maintained.

One preferred embodiment of the invention is distinguished by the step: a specific air temperature and/or a specific air humidity and/or a specific CO2 concentration and/or a specific NH3 concentration and/or a specific air pressure are/is set in the straw pen, preferably in the living space, furthermore preferably in a region directly above, preferably 1 to 2.4 m, furthermore preferably 1 to 2 m, even furthermore preferably 1 to 1.5 m above, the straw mat. This embodiment of the invention particularly offers the advantage that the pen climate in the case of a straw mat produced in this manner is further improved, the ammonia pollution in the pen area is further reduced, the infestation by flies is further reduced, and, above all, a straw mat produced in this manner can remain in the straw pen for the duration of a complete run. A run in the present disclosure is to be understood to be a temporal period from moving the animals into the pen until moving said animals out, wherein this temporal period in a manner known to the person skilled in the art depends on whether piglets or sows are farmed or fattening is carried out.

One preferred embodiment of the invention is distinguished in that the air temperature and/or the CO2 content of the air and/or the air humidity are/is used as a control variable for preserving the straw mat or manure mat, respectively.

One preferred embodiment of the invention is distinguished in that the air humidity in the straw pen, preferably in the living space, furthermore preferably in a region above the straw mat, is set to below the dew point.

One preferred embodiment of the invention is distinguished by the steps: a presence of areas of the straw mat that are moister in relation to the remaining straw mat is automatically detected, and straw which is preferably present as a mixture of defibrated and long-fiber straw and which furthermore preferably includes a composting agent, furthermore preferably including a mineral soil additive, which promotes a rotting process and substantially prevents putrefaction is post-spread in an automatic targeted manner onto the detected areas of the straw mat that are moister in relation to the remaining straw mat. In the case of this invention, the straw consumption is particularly advantageously further reduced, since straw is post-spread in a targeted manner only in those areas of the straw mat that are moister in relation to the remaining straw mat.

The object of the invention is, in particular, also achieved by a straw mat according to the claims. One advantage of the straw mat that, according to the invention, is distributed in a uniform manner so as to be elastic underfoot in the living area, in particular, lies in that the animals are not distributed in a non-uniform manner in the living area and thus do not further amplify the unevenness of the straw mat. This, in turn, results in an exposed floor in the living space being permanently avoided such that the straw mat on account thereof permanently remains elastic underfoot in the entire living space so that joint and bone problems, abscesses, or decubitus in the animals are, in particular, permanently prevented on account of the straw mat according to the invention.

Preferred embodiments of the straw mat according to the invention are stated in the dependent claims.

One preferred embodiment of the straw mat according to the invention is distinguished in that the thickness after initial spreading of straw and prior to being occupied by livestock is at most 0.2 m, preferably at most 0.1 m, furthermore preferably at most 0.05 m. The advantages of the present invention mentioned at the outset are further amplified on account of the afore-mentioned thicknesses, furthermore preferably on account of thicknesses of approximately 0.2 m, approximately 0.1 m, or approximately 0.05 m, respectively. The straw consumption is, in particular, further reduced, on account of said preferred thicknesses of the straw mat. The present invention has at the same time established that the resilience or elasticity, respectively, of the straw mat can be permanently maintained on account of the preferred thicknesses, since the resilience on account of the uniformity of the straw mat required according to the invention can also be adequately ensured in the case of these minor thicknesses, while the straw consumption is simultaneously even further reduced such that the economy of the straw mat according to the invention significantly differs from the economy of the known straw mats. In this context, the invention has also recognized that after an initial spreading of straw and prior to being occupied by livestock a thickness of approximately 0.2 m is preferable in the case of fattening pigs, of approximately 0.1 m is preferable in the case of sows, and of approximately 0.05 m is preferable in the case of piglets, since the thickness, in terms of being adapted to the average weight of the respective livestock, is capable of being reduced to the afore-mentioned thicknesses on account of the dissimilar weight of the different types of livestock, so as to achieve a minimal straw consumption while simultaneously ensuring the elasticity underfoot.

One preferred embodiment of the straw mat according to the invention is distinguished in that the average thickness after being occupied by livestock is at most 0.5 m, preferably at most 0.3 m, furthermore preferably at most 0.2 m, even furthermore preferably at most 0.1 m. The invention has recognized that the advantages of the present invention mentioned at the outset can, in particular, be implemented by way of the aforementioned dimensions of the maximum thicknesses of the straw mat after being occupied by livestock. The invention herein has also recognized that, after being occupied by livestock, in particular, by automatic demand-based post-spreading of straw in the living space of the livestock, thicknesses in the range from approximately 0.3 m to 0.5 m are particularly suitable for fattening pigs, while thicknesses after the preferably automatic demand-based post-spreading of straw in a range from approximately 0.2 m to approximately 0.3 m are particularly suitable for sows, while thicknesses after a preferably automatic demand-based post-spreading of straw in the living space of the livestock in a range from approximately 0.1 m to approx. 0.2 m are particularly suitable for piglets. This is because the invention has also recognized that the thicknesses of the straw mats by, for example, demand-based post-spreading that is automatically carried out, can also be adapted to the weight of the respective type of livestock in a targeted manner after the initial spreading so as to even further reduce the straw consumption or the quantity of the generated manure, respectively, so as to be adapted to the weight of the animals even after the initial spreading, while the advantages of the present invention described at the outset continue to be maintained on account of the afore-mentioned thicknesses.

The object of the invention is also achieved by a straw pen according to the claims. The advantages of the straw pen according to the invention are identical to the advantages of the present invention mentioned at the outset. In particular, the straw pen according to the invention also has the aforementioned advantages of the straw mat according to the invention, since the straw pen according to the invention in the living space thereof has the straw mat according to the invention.

Preferred embodiments of the straw pen according to the invention are stated in the dependent claims.

One preferred embodiment of the straw pen according to the invention is distinguished by a substantially flat, preferably gap-free floor which serves as the living space, and a pedestal which, in relation to the floor, is raised by preferably at least approximately 0.2 m to at least approximately 0.5 m, furthermore preferably in a stepped manner, and which serves as a feeding and/or watering region. The advantage of the pedestal, which is raised in relation to the moving space and serves as a feeding and/or watering region, lies in particular in that the pedestal serving as a feeding and/or watering region can be kept free of straw in a simple manner, since said straw is preferably spread only in the moving space, on account of which it is, in turn, ensured that, ideally, no straw makes its way into the feeding and/or watering region, on account of which it is, in turn, advantageously prevented that water which is optionally present in the feeding and/or watering region, or moisture present therein, respectively, is introduced into the straw mat present in the moving space. It is advantageously achieved in this way that the straw that can remain sufficiently dry in the moving space so as to be able to maintain the desired elasticity of the straw mat according to the invention in the moving space in order for the advantages according to the invention of preventing decubitus, joint and bone problems, or abscesses in the livestock to be able to be permanently maintained in such a straw pen.

The pedestal preferably occupies an area of approximately 20% of the living space. This has proven to be a species-appropriate apportioning.

The pedestal floor is preferably slightly roughened so as to advantageously enable an abrasion of the hooves of the livestock in the region of the pedestal.

The moving space preferably has a single discharge trench so as to be able to discharge cleaning water required when mucking out the straw pen.

One preferred embodiment of the straw pen according to the invention is distinguished by an air-conditioning installation for setting a specific air temperature and/or air humidity in the straw pen, wherein the air temperature and/or the air humidity is preferably set in a region directly above, furthermore preferably 1 to 2.4 m, even furthermore preferably 1 to 2 m, even furthermore preferably 1 to 1.5 m above, the straw mat. The advantages of this embodiment lie, in particular, in that the pen climate in a pen of this type is further improved, the ammonia pollution in the pen area is further reduced, the infestation by flies is further reduced, and, above all, a straw pen of this type has the advantage that the straw mat situated in the living space, preferably in the moving space, can remain in the straw pen for the duration of a complete run before said straw pen has to be mucked out.

One preferred embodiment of the straw pen according to the invention is distinguished in that the air-conditioning installation is configured in such a manner that the climate parameters for determining the control variable is capable of being set below the dew point directly above, preferably 1 to 2.4 m, even more preferably 1 to 2 m, even more preferably 1 to 1.5 m above the straw mat.

One preferred embodiment of the straw pen according to the invention is distinguished in that the air-conditioning installation is configured in such a manner that the air temperature and/or the $CO_2$ content of the air and/or the air humidity are/is used as a control variable for preserving the straw mat or manure mat, respectively. This is because it has been demonstrated that the advantages of the present invention mentioned at the outset are particularly clearly evident in the case of such values.

One preferred embodiment of the straw pen according to the invention has an automatic spreading installation for initially spreading straw for the straw mat and/or for post-spreading of straw for the straw mat, wherein the automatic spreading installation is preferably equipped with sensors for detecting areas of the straw mat that are moister in relation to the remaining straw mat, so as to furthermore preferably post-spread straw onto said moister areas in a targeted manner. The advantages of an automatic spreading installation lie in particular in that manual spreading and the time-intensive and cost-intensive input in terms of personnel associated therewith can be completely dispensed with. The provision of an automatic spreading installation thus offers very significant economic advantages. At the same time, farming of the livestock that is adapted to the behavior of the animals is ensured, since the automatic spreading installation ensures that a straw mat, having a uniform thickness is present everywhere in the living space, or everywhere in the moving space in the presence of the pedestal. The preferred specification of the automatic spreading installation with sensors for detecting areas of the straw mat that are moister in relation to the remaining straw mat offers the advantage that it can thus be established in a fully automatic and targeted manner where the straw mat has become moister, such that it can be established in a fully automatic and targeted manner in the case of this embodiment in which areas a post-spreading procedure of straw has to be optionally performed. This embodiment thus ensures according to the invention that only the absolutely required minimum quantity of straw has to be post-spread since post-spreading of straw is required only in areas of the straw mat that are moister in relation to the remaining straw mat. In the case of the furthermore preferred embodiment in which straw has to be post-spread in a targeted manner only on the comparatively moist areas, the aforementioned advantages are implemented in a particularly simple manner with the aid of the automatic spreading installation.

One preferred embodiment of the straw pen according to the invention is distinguished in that the sensors are optical sensors, preferably operating in the infrared range, and/or acoustic sensors, preferably operating in the ultrasonic range, and/or inductive and/or capacitive sensors. The automation of the post-spreading procedure can be implemented in a particularly simple manner with the aid of sensors of this type, the technical embodiment of the latter in detail being well known to the person skilled in the art.

One preferred embodiment of the straw pen according to the invention is distinguished in that by way of a gantry system that serves as an automatic spreading installation, having a straw basket for receiving straw to be spread in such a manner that straw by means of the gantry system is capable of being dropped over each portion of the living space. Such a straw pen has the further advantage that the automation according to the invention of the initial spreading, or of the demand-based post-spreading, respectively, can be implemented in a particularly simple manner on account of the gantry system according to the invention, having a straw basket for receiving straw to be spread, wherein straw is capable of being dropped over each portion of the living space by means of the gantry system. This is because an automatic spreading installation according to the present invention, having such a gantry system, preferably having sensors for detecting areas of the straw mat that are moister in relation to the remaining straw mat, can reach each point within a living space in a particularly simple manner and is, therefore, capable of dropping in a targeted manner only that quantity of straw that is required for an initial spreading, or for a targeted post-spreading of, for example, a moister region of the straw mat detected by the sensors, respectively, over each point within the living space. The method according to the invention for producing a straw mat in a living space for livestock provided in a straw pen can thus be implemented in a particularly cost-effective manner by way of such a gantry system. It is moreover particularly advantageous that gantry systems of this type can be retrofitted in a simple manner also in the case of existing straw pens.

The object is in particular also achieved by a pen building according to the claims. The pen building according to the invention has all the advantages of the invention mentioned at the outset, since said pen building has a straw pen according to the invention, which, in turn, has a straw mat according to the invention.

BRIEF DESCRIPTION OF THE DRAWINGS

Preferred embodiments of the invention will be described hereunder by means of the appended drawings. In the case of doubt, identical or functionally identical parts are identified by the same reference signs. In the drawings.

DETAILED DESCRIPTION OF THE EMBODIMENTS

Figure 1:
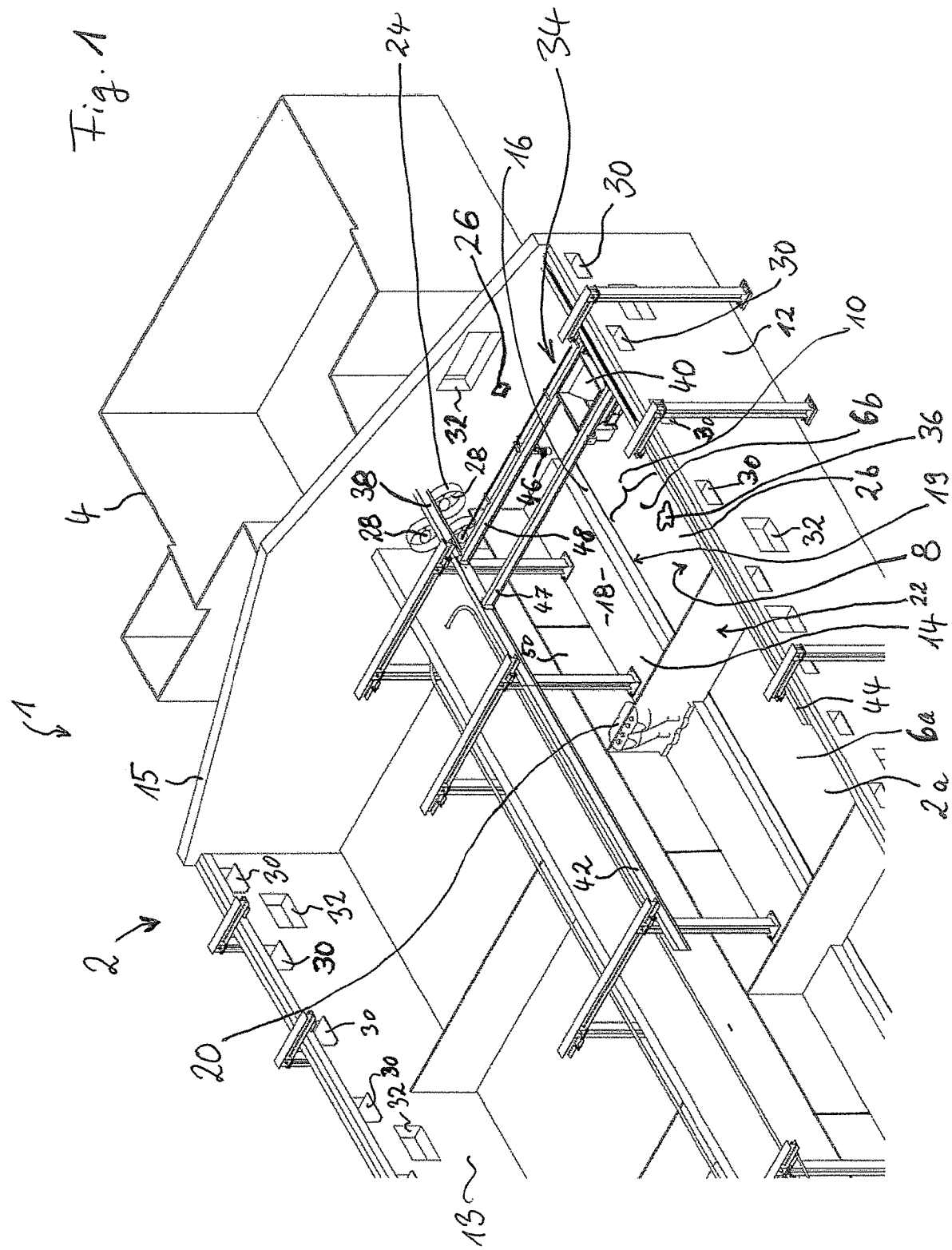
FIG. 1 is a perspective view of an embodiment of a pen building according to the invention, without a roof.

FIG. 1 is a perspective schematic view of an embodiment of a pen building 1 according to the invention, without a roof. The pen building 1 has a straw pen 2, and an auxiliary building 4 that is not relevant to the present invention. The straw pen 2 is configured according to the invention in the two bays 2a and 2b illustrated at the bottom right in FIG. 1, while the remaining bays are illustrated for purely graphic reasons in order for the pen building 1 to be completed, but may also be omitted. One of the bays 2a or 2b, respectively, is entirely sufficient for the implementation of the embodiment of the pen building 1 according to the invention, or of the straw pen 2 according to the invention, respectively, illustrated in FIG. 1.

The straw pen 2 according to FIG. 1 in each case has one living space 6a or 6b, respectively, for livestock, for example for sows and/or fattening pigs and/or piglets, at least in each of the bays 2a and 2b.

In order for the further description to be simplified, only the living space 6b of the straw pen 2 will be described in more detail hereunder. However, the living space 6a is preferably configured so as to be functionally identical.

The living space 6b has a straw mat 8. The straw mat 8 has a substantially uniform thickness, which is substantially elastic underfoot. The straw pen in the bay 2b has a substantially flat, preferably gap-free, floor which, in FIG. 1, is obscured by the straw mat 8 and serves as a moving space 10. The moving space 10 in FIG. 1 for purely illustrative reasons is plotted using the curly bracket only in the visible region; however, the moving space 10 actually extends up to a side wall 12 of the pen building 2.

The moving space 10 on that side of the moving space 10 that faces away from the side wall 12 is adjacent to a pedestal 14 of the living space 6b which is elevated in a stepped-manner and serves as a feeding and/or watering region. The pedestal 14 has a step 16 which in relation to the floor in the moving space 10 is elevated by 0.2 m. The pedestal 14 furthermore has an upper face 18 which in relation to the plane of the step 16 is yet again elevated by 0.2 m. The surface 18 is slightly roughened so as to enable an abrasion of the hooves of the livestock when the latter is situated on the plane 18. The straw mat 8 in the embodiment illustrated in FIG. 1 likewise has a thickness of 0.2 m such that the surface of the straw mat 8 and the surface of the step 16 lie in one plane and are mutually contiguous at the line 19 of FIG. 1.

In order for the pedestal 14 that serves as a feeding and/or watering region to be completed, said pedestal 14 is equipped with a feeding and watering station 20 which is integrated in a bay separation wall 22 for separating the bay 2a from the bay 2b.

The straw mat 8 is spaced both horizontally as well as vertically from the surface 18 of the pedestal 14 by the step 16, such that substantially no straw of the straw mat 8 lying in the movement space 10 makes its way onto the surface 18.

The straw pen 2 of the embodiment illustrated in FIG. 1 moreover has an air-conditioning installation 24 for setting a specific air humidity in the straw pen 2. The air-conditioning installation 24 is configured such that the air humidity with the aid of said air-conditioning installation 24 is capable of being set to a specific desired value in a region of approximately 1 m to approximately 2 m above the straw mat 8. For this purpose, the air-conditioning installation 24 has a sensor for establishing the air humidity in the bay 2b, said sensor being connected to closed-loop electronic control (not illustrated) of the air-conditioning insulation 24 in order for correspondingly pre-treated air to be blown into the bay 2b with the aid from the bay 2b of fans 28 of the air-conditioning insulation 24. It is likewise possible that air from the bay 2b is suctioned, dried, or humidified with the aid of the fans 28 and is again blown into the bay 2b by way of at least one of the fans 28. In order for air to be discharged or supplied, the pen building 2, in particular, in the region of the bays and thus also in the region of the bay 2b, furthermore has ventilation flaps 30 which by way of the controls of the air-conditioning insulation 24 for discharging air from the bay 2b, or for supplying fresh air to the bay 2b can be opened or closed, preferably by actuators (not illustrated).

The straw pen 2 in the sidewall 12, in the opposite sidewall 13, and in the wall 15 which in FIG. 1 lies toward the auxiliary building 4, moreover has windows 32 which enable light to enter the bays of the straw pen 2, thus, in particular, also the bay 2b. The windows 32 can optionally also be closed.

The straw pen 2 furthermore has an automatic spreading installation 34, for the initial spreading of straw for the straw mat 8 and for post-spreading straw for the straw mat 8, wherein the automatic spreading installation 34 has sensors (not illustrated) for detecting areas 36, of the straw mat that are moister in relation to the remaining straw mat 8, so as to be able to post-spread straw in a targeted manner onto said moister areas 36 on the straw mat 8. The moister area 36 is illustrated in only a schematic and also only symbolic manner in FIG. 1. The moister area 36, can rather be situated at each area on the straw mat 8 within the moving space 10 on the straw mat that is delimited by the step 16 at the line 19, by the bay wall 22, by the external wall 12, and by the front wall 15.

The sensors (not illustrated) of the automatic spreading installation 34 are, for example, optical sensors, preferably operating in the infrared range, and/or acoustic sensors, preferably operating in the ultrasonic range, and/or inductive and/or capacitive sensors.

The automatic spreading installation in the embodiment of the pen building 1 according to the invention, or of the straw pen 2 according to the invention, respectively, illustrated in FIG. 1 comprises a gantry system 38 with a straw basket 40 for receiving straw be spread into the living space 6b of the bay 2b that is formed by the moving space 10 and the pedestal 14 for the initial spreading of straw, or for post-spreading straw for the straw mat 8, respectively.

The automatic spreading installation 34, and, in particular, the straw basket 40 can be moved in a plane above the bay 2b with the aid of the gantry system 38. To this end, the spreading installation has support rails 42, 44 which run parallel to the external wall 12, and on which, with the aid of an electric motor 46, rails 47, 48 that run perpendicularly to the latter and are guided in the rails 42, 44 are repositionable in a manner parallel to the sidewall 12. The straw basket 40, in turn, with the aid of an electric motor 49 illustrated in FIG. 6, can be repositioned along the rails 47, 48 in a manner transverse to the direction of movement of the rails 47, 48. In this way, the automatic spreading installation 34, for example, at the position of the straw basket 40 illustrated in FIG. 1, is capable of receiving spreading material, in particular, straw, through a roof hatch (not illustrated) in the roof (not illustrated) and in a manner corresponding to the demand of spreading said straw in a targeted manner, specifically into the living space 6b, in particular, into the moving space 10 defined above. One preferred embodiment of the method according to the invention used to this end will be described in yet more detail hereunder, in particular, with reference to FIG. 7.

The embodiment of the straw pen 2 according to the invention illustrated in FIG. 1, however, has an automatic spreading installation 34 which can, in particular, perform an automatic initial spreading of defibrated straw up to a substantially uniform and predetermined thickness of the straw mat 8, for example, up to a thickness of 0.15 m, in particular, in the moving space 10. The height of the straw mat 8, after such an initial spreading with the aid of the automatic spreading installation 34, thus lies below 100%, and above 50% of the height of 0.2 m of the step 16 of the pedestal 14 which in the embodiment illustrated functions as a part of the separating element that is directly adjacent to the straw mat 8.

The automatic spreading installation 34, prior to, after and/or also simultaneously with the initial spreading of straw, with the aid of the straw basket 40 is moreover capable of dropping a composting agent, preferably including a mineral soil additive, which promotes the rotting process and substantially prevents putrefaction at each location within the bay 2b, preferably at each location within the moving space 10.

The automatic spreading installation 34, after the initial spreading of straw is furthermore capable of increasing the thickness of the straw mat 8 present after the initial spreading by, for example, 0.05 m to then 0.2 m, as is illustrated in FIG. 1, by way of automatic demand-based post-spreading. This thickness of the post-spreading in the case of the embodiment illustrated here thus lies between approximately 5% and approximately 10% of the thickness of the straw mat 8 present after the initial spreading.

The automatic spreading installation 34 is moreover capable of automatically detecting the presence of areas 36 of the straw mat 8 that are moister in relation to the remaining straw mat 8, and of post-spreading straw in an automatic targeted manner onto the detected areas 36 of the straw mat 8 that are moister in relation to the remaining straw mat 8, said straw being present as a mixture of defibrated and long-fiber straw which includes a composting agent which promotes a rotting process and substantially prevents putrefaction and includes a soil additive. In other words, the automatic spreading installation 34 by means of a sensory evaluation of the present straw mat 8 is thus capable of determining the demand for straw to be post-spread, for example, in an optical manner in the context of an image evaluation, for example, with the aid of a camera which may operate in the visible or else in the invisible range of light. Alternatively or additionally, non-optical sensors, for example, ultrasonic sensors, inductive sensors, or else capacitive sensors are conceivable. The ascertaining of the areas 36 where post-spreading of straw and/or of a composting agent is necessary herein can be performed instantaneously, that is to say, immediately when travelling across the bays, and the post-spreading of straw can also be performed immediately; however, alternatively it is also conceivable that the sensory survey of the present straw mat 8 or else of all straw mat 8 in the straw pen 2 is first performed in a first step and the post-spreading is thereafter only performed in a second step. In the case of such a variant it is possible, for example, for the composition of the straw to be post-spread to be correspondingly adapted by way of a choice of corresponding ratios of defibrated straw, long-fiber straw, and/or composting agent.

Figure 2:
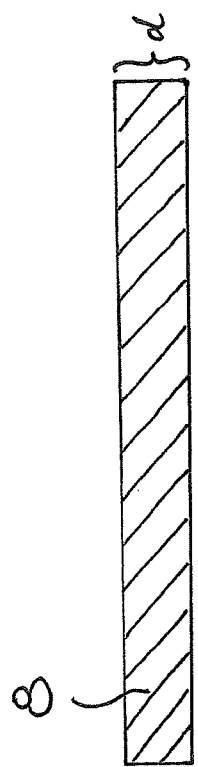
FIG. 2 is a schematic sectional view of an embodiment of a straw mat according to the invention.

FIG. 2 shows an embodiment of a straw mat 8 according to the invention, such as can be introduced or used, respectively, for example in the moving space 10 of the straw pen of FIG. 1. The straw mat 8 in the exemplary embodiment illustrated in FIG. 2 has a substantially uniform thickness d, which is elastic underfoot and is formed from defibrated straw, of 0.2 m. In order for the function according to the invention as a base for livestock to be fulfilled, it is sufficient for the straw mat after the initial spreading of straw to have a substantially uniform thickness of at most 0.05 m. However, the straw mat 8, after the initial spreading, can also have any other average thickness of approximately 0.025 m to approximately 0.2 m. After being occupied by livestock, the straw mat 8 can have thicknesses between approximately 0.1 m and approximately 0.5 m.

The straw mat 8 of the embodiment of FIG. 2 is preferably produced by a method according to the invention for producing a straw mat in a living space for livestock, in particular, for sows and/or fattening pigs and/or piglets, provided in a straw pen. A straw mat 8, according to FIG. 2 is particularly preferably produced by a method such as is described in an exemplary manner with reference to FIG. 7.

Figure 3:
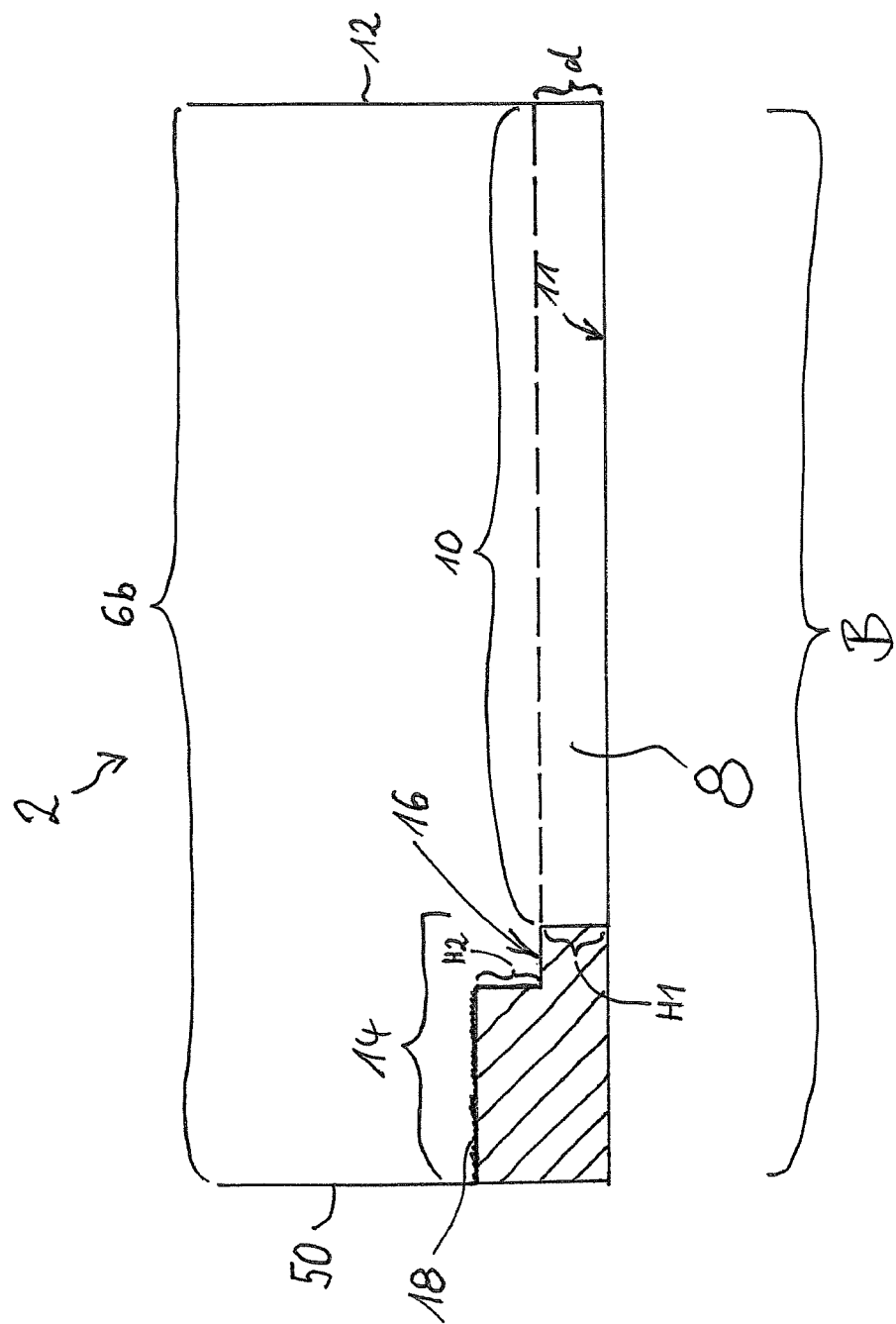
FIG. 3 is a schematic sectional view of an embodiment of a straw pen according to the invention.

FIG. 3 shows a further embodiment of a straw pen 2 according to the invention. The embodiment of the straw pen 2, illustrated in FIG. 3 may have all features of the straw pen 2, according to the first embodiment according to FIG. 1, but this is not mandatory.

The straw pen 2 of the second embodiment according to FIG. 3 has a living space 6b. The living space is illustrated in a schematic sectional view. The living space has a substantially flat, gap-free floor, 11 which serves as a moving space 10 and is preferably represented by a substantially smooth concrete slab, and a pedestal 14 which in relation to the floor 11 is elevated in a stepped manner and serves as a feeding and watering region of the living space 6b. The pedestal 14 has a step 16 which in relation to the floor 11 is elevated by a height H1 of 0.2 m. The pedestal 14 moreover has a slightly roughened surface 18 for the abrasion of the hooves of the livestock which in relation to the step 16 is likewise elevated by a height H2 of 0.2 m.

A straw mat 8 is situated in the moving space 10 of the living space 6b. The straw mat 8 of FIG. 3 can be, for example, preferably the straw mat 8 of FIG. 2 and/or else the straw mat 8 of FIG. 1. The straw mat 8 of FIG. 3 has a thickness d of 0.2 m, for example. The straw mat 8 of FIG. 3 on account of initial spreading of straw has been created to a height of 0.15 m and on account of subsequent post-spreading of straw been created to the thickness d of 0.2 m.

The living space, in particular the feeding and watering region 14, is illustrated on the left in FIG. 3 and delimited by a bay separation wall 50, and is illustrated on the right in FIG. 3 and delimited by an external wall 12 of the straw pen 2. In the direction perpendicular into the paper plane of FIG. 3, the living space 6b is delimited by a wall 15 of the pen building 1 of FIG. 1, for example, while the living space 6b toward the observer is delimited for example by a bay separation wall 22, according to FIG. 1.

The pedestal 14 in the embodiment illustrated in FIG. 3 occupies approximately 25% of the overall width B of the living space 6b. The pedestal 14 preferably occupies approximately 20% of the base area of the living space 6b.

Figure 4:
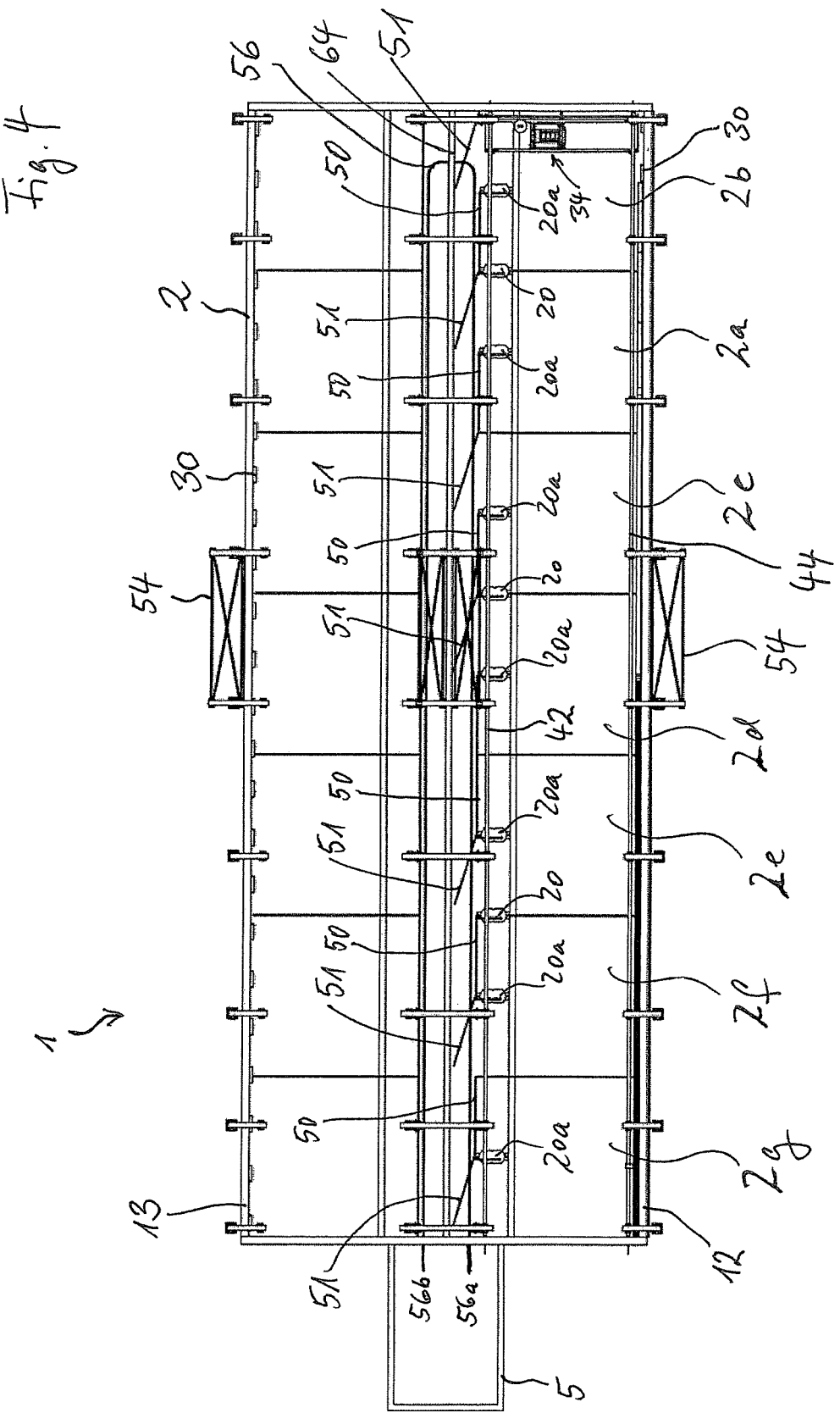
FIG. 4 is a schematic plan view of a further embodiment of a pen building according to the invention, without a roof.

FIG. 4 shows a schematic plan view of a further embodiment of a pen building 1 according to the invention, without a roof. The pen building 1 of FIG. 4 is preferably substantially functionally identical to the pen building 1 of FIG. 1.

As opposed to the pen building 1 of FIG. 1, the pivotable parts 51 of the bay separation walls 50, illustrated so as to be closed in FIG. 1, are illustrated so as to be half open in FIG. 4. The open parts 51 of the bay separation walls 50 in the right four bays 2a, 2b, 2c, and 2d herein are illustrated in FIG. 4, while the pivotal parts 51 in the three bays 2e-2g illustrated on the left form a left part of the respective bay separation wall 50.

The pen building outside the lateral external walls, 12 and 13, respectively, moreover has cross stays 54 so as to counteract dynamic forces that optionally arise in the rail 44 (on the side wall 13, not illustrated). Corresponding cross stays 54 are also provided in the central region of the pen building 1 and by way of the rail 42 (the potential rail facing the upper bays is not illustrated, as is also the case in FIG. 1) counteract dynamic forces being created.

In addition to the embodiment of FIG. 1, the pen building 1, or the straw pen 2, respectively, of FIG. 4 in the bays 2a-2f has an in the center of the pedestal 14 serving as a feeding and watering region, a feeding station 20a.

As is also schematically indicated in the embodiment of FIG. 1, the embodiment of the straw pen 1 of FIG. 4 also has an annular supply line 56, provided in the central region, for supplying the feeding stations 20 and 20a. To this end, the supply line in a preferably provided auxiliary building 5 of the pen building 1 is fed by way of a supply inlet 56a and conveyed back by way of a supply outlet 56b.

Figure 5:
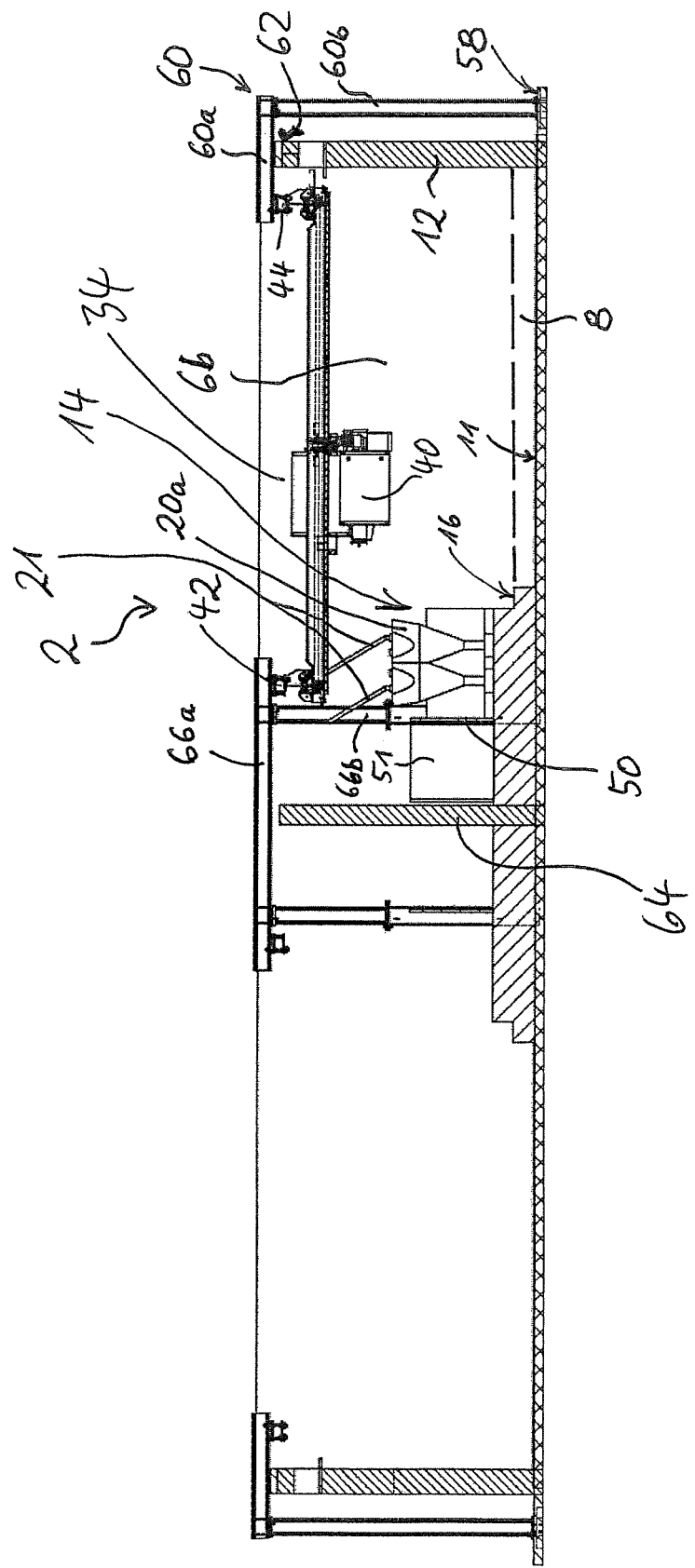
FIG. 5 is a partially sectional lateral view of the pen building of FIG. 4.

FIG. 5 shows a schematic partially sectional lateral view of an embodiment of a straw pen according to the invention. The straw pen illustrated in FIG. 5 in terms of the functions thereof preferably corresponds substantially to one or both embodiments of the straw pen 2, according to FIGS. 1 and 3. Identical or functionally identical parts are, therefore, again reproduced using the same reference signs. Reference is moreover made to the description of the corresponding features of the straw pen 2, according to FIG. 1 or according to FIG. 3, respectively. As is also the case in FIG. 3, the straw mat 8 for purely graphic reasons is plotted by way of a dashed line.

As can also be seen in the embodiment of FIG. 1, the straw pen 2 of the embodiment of FIG. 5 outside the straw pen 2 also has a support arm system 60 which is provided in the floor 58 and on which the rail 44 of the gantry system which runs parallel to the sidewall is suspended. To this end, horizontal short arms 60a of the support arm 60 run from the vertical support 60b, anchored to the floor, of the support arm system 60 through openings 62 in the side wall 12 toward the inside into the living space 6b.

In an analogous mirror-symmetrical manner, vertical supports 66b on which, as opposed to the support 60b on the sidewall 12, horizontal arms 66a that span the central internal wall 64 however hold the rail 42 that faces the bay separation wall 50, are likewise disposed on the bay separation wall 50 that faces a central internal wall 64 of the straw pen 2. Furthermore, supply lines 21 which connect the feeding station 20a to the central supply line 56 (not illustrated in FIG. 5), are schematically indicated.

Figure 6:
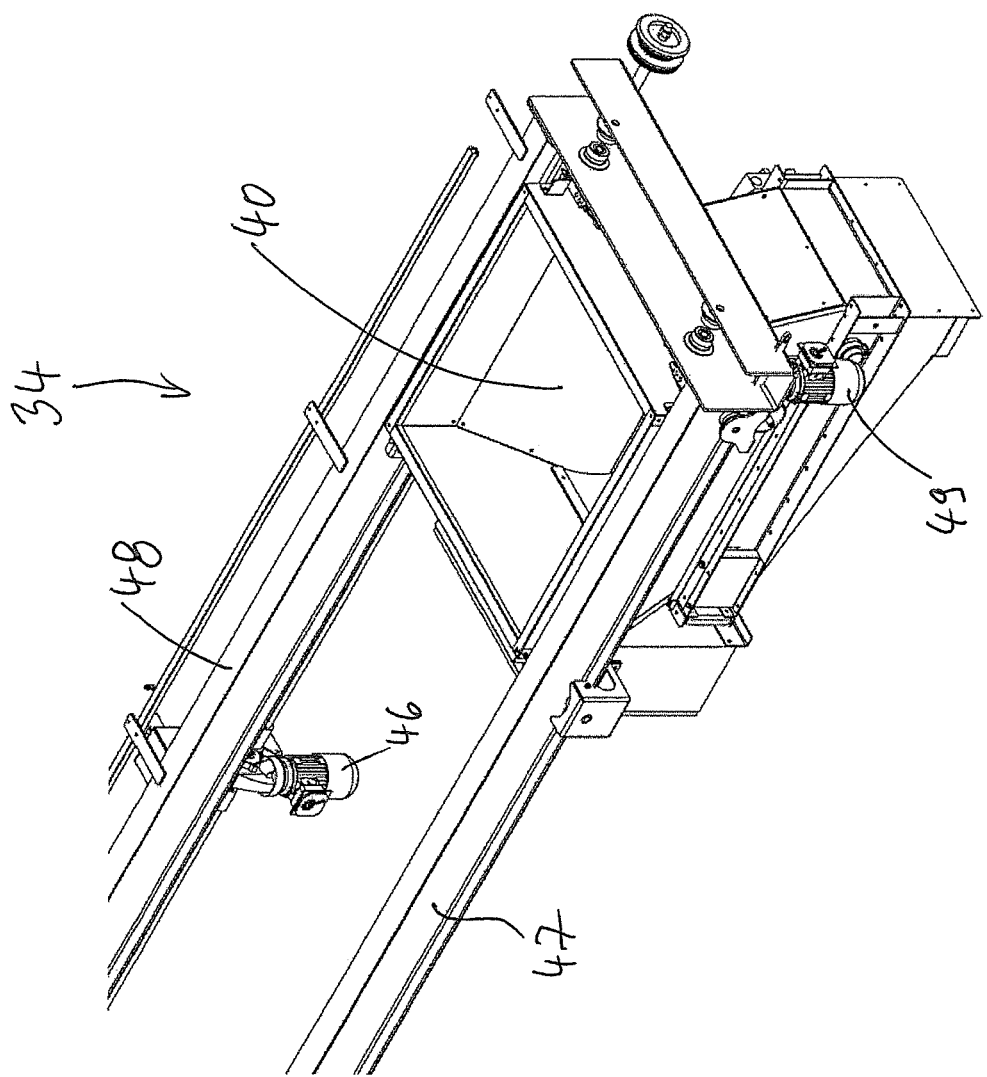
FIG. 6 is an enlarged perspective detailed view of the straw basket of FIGS. 4 and 5.

FIG. 6 shows an enlarged schematic detailed view of the automatic spreading installation 34, according to FIGS. 1, 4, and 5. Identical or functionally identical parts, respectively, are identified by the same reference signs.

Figure 7:
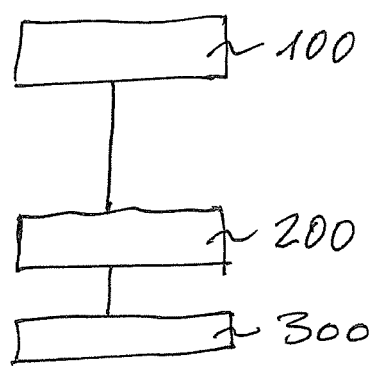
FIG. 7 is a schematic illustration of an embodiment of the method according to the invention.

FIG. 7 shows a schematic illustration of an embodiment of a method according to the invention. The embodiment of FIG. 7 is distinguished in that a method for producing a straw mat, for example, a straw mat 8 as per one of the preceding embodiments, in a living space, for example, a living space 6b as per one of the preceding embodiments, for livestock, in particular, for sows and/or fattening pigs and/or piglets, provided in a straw pen, for example in a straw pen 2, as per one of the preceding embodiments, according to step 100 automatic initial spreading of preferably defibrated straw into the living space is performed up to a substantially uniform thickness of the straw mat, wherein the initial spreading is performed up to a substantially uniform thickness d of the straw mat 8 of at most 0.2 m, preferably at most 0.1 m, furthermore preferably at most 0.05 m.

When a separating element which on a moving space for the livestock separates a drinking and feeding region for the livestock is provided in the living space, the initial spreading can also be performed up to a substantially uniform thickness of the straw mat of at most 100%, preferably at most 50%, furthermore preferably at most 20%, of a height of the separating element that is directly adjacent to the straw mat.

In a step 200, a composting agent, comprising a mineral soil additive, which promotes a rotting process and substantially prevents putrefaction is preferably put into the living space. Alternatively, the step 200 can also be carried out simultaneously with the step 100.

A further step 300 preferably follows in which the thickness of the straw mat after the initial spreading by automatic demand-based post-spreading is increased by at most 20%, preferably at most 10%, furthermore preferably at most 5% of the thickness of the straw mat present after the initial spreading according to step 100.

The thickness d of the straw mat 8, after the initial spreading by automatic demand-based post-spreading is preferably set in a range of at most 0.5 m, preferably at most 0.3 m, furthermore preferably at most 0.2 m, even furthermore preferably at most 0.1 m.

A specific air temperature and/or a specific air humidity and/or a specific CO2 concentration and/or a specific NH3 concentration and/or a specific air pressure, are/is preferably set in the straw pen 2, preferably in the living space 6b, furthermore preferably in a region directly above, preferably 1 to 2.4 m, furthermore preferably 1 to 2 m, even furthermore preferably 1 to 1.5 m above, the straw mat 8.

The method according to the invention according to FIG. 7 can comprise the further steps: a presence of areas of the straw mat 8 that are moister in relation to the remaining straw mat 8 is automatically detected, and straw which is preferably present as a mixture of defibrated and long-fiber straw and which furthermore preferably includes a composting agent, furthermore preferably including a mineral soil additive, which promotes a rotting process and substantially prevents putrefaction is post-spread in an automatic targeted manner onto the detected areas of the straw mat 8 that are moister in relation to the remaining straw mat 8 (these steps are not illustrated in FIG. 7).

The invention claimed is:

1. A method for producing a straw mat in a living space for livestock confined in a straw pen, the method comprising the steps of:
   automatically and initially spreading a quantity of straw into the living space up to a uniform thickness (d) of the straw mat by dropping the quantity of straw over the living space, wherein the straw mat remains in the living space for a duration of the entire period within which the livestock is confined in the straw pen; and
   automatically and demand-based post-spreading by dropping an additional quantity of straw over a targeted portion of the living space, wherein the targeted portion of the living space defines an area less than the living space.

2. The method of claim 1, wherein the livestock comprises sows and/or fattening pigs and/or piglets.

3. The method of claim 1, wherein the quantity of straw comprises defibrated straw.

4. The method according to claim 1, wherein the step of automatically and initially spreading the quantity of straw is performed up to a uniform thickness (d) of the straw mat of at most 0.2 meters.

5. The method according to claim 1, wherein the step of automatically and initially spreading the quantity of straw is performed up to a uniform thickness (d) of the straw mat of at most 0.1 meters.

6. The method according to claim 1, wherein the step of automatically and initially spreading the quantity of straw is performed up to a uniform thickness (d) of the straw mat of at most 0.05 meters.

7. The method according to claim 1, wherein a separating element which separates a moving space for the livestock from a drinking and feeding region for the livestock is provided in the living space; and
   wherein the step of automatically and initially spreading the quantity of straw is performed up to a uniform thickness (d) of the straw mat of at most 100% of a height of the separating element that is directly adjacent to the straw mat.

8. The method according to claim 7, wherein the step of automatically and initially spreading the quantity of straw is performed up to a uniform thickness (d) of the straw mat of at most 50% of a height of the separating element that is directly adjacent to the straw mat.

9. The method according to claim 7, wherein the step of automatically and initially spreading the quantity of straw is performed up to a uniform thickness (d) of the straw mat of at most 20% of a height of the separating element that is directly adjacent to the straw mat.

10. The method according to claim 1, further comprising the step of:
    dropping and delivering a composting agent by dropping the composting agent over the living space or the targeted portion of the living space which promotes a rotting process and prevents putrefaction into the living space.

11. The method according to claim 10, wherein the step of automatically and initially spreading the quantity of straw further includes the step of spreading the composting agent which promotes a rotting process and prevents putrefaction.

12. The method according to claim 10, wherein the composting agent which promotes a rotting process and prevents putrefaction comprises a mineral soil additive.

13. The method according to claim 1, wherein method further comprises the step of:
    increasing the thickness (d) of the straw mat after the automatic and initial spreading step is performed by automatic demand-based post-spreading by dropping an additional quantity of straw over the living space or the targeted portion of the living space between at most 5% and 20% of the thickness (d) of the straw mat present after the automatic and initial spreading step is performed.

14. The method according to claim 13, further comprising the step of:
    increasing the thickness (d) of the straw mat after the automatic and initial spreading step is performed by automatic demand-based post-spreading between at most 0.1 m and 0.5 m of the thickness (d) of the straw mat present after the automatic and initial spreading step is performed.

15. The method according to claim 1, further comprising the step of:
    setting a specific air temperature, a specific air humidity, a specific $CO_2$ concentration, a specific $NH_3$ concentration, and/or a specific air pressure in the living space of the straw pen in a region between 1 m and 2.4 m directly above the straw mat.

16. A method for producing a straw mat in a living space for livestock confined in a straw pen, the method comprising the steps of:
    automatically and initially spreading a quantity of straw into the living space up to a uniform thickness (d) of the straw mat by dropping the quantity of straw over the living space; and automatically and demand-based post-spreading by dropping an additional quantity of straw over a targeted portion of the living space;

wherein the straw mat remains in the living space for a duration of the entire period within which the livestock is confined in the straw pen and the method further comprises the steps of:

automatically detecting a presence of areas of the straw mat in the living space that are moister in relation to the remaining straw mat; and post-spreading straw in an automatic targeted manner onto the detected areas of the straw mat that are moister in relation to the remaining straw mat straw by dropping an additional quantity of straw over the targeted portion of the living space.

17. The method according to claim 16, wherein the straw of the post-spreading step comprises a mixture of defibrated and long-fiber straw and a composting agent which promotes a rotting process and prevents putrefaction.

* * * * *